May 23, 1967   M. J. PEDONE, JR., ET AL   3,321,650
CONTROL MECHANISM FOR ROTARY POWER DRIVEN DEVICES
Filed Oct. 19, 1964   4 Sheets-Sheet 1

INVENTORS
MICHAEL J. PEDONE, JR
HARRY L. BEAM

BY Arnold and Roylance

ATTORNEYS

May 23, 1967
M. J. PEDONE, JR., ET AL
3,321,650
CONTROL MECHANISM FOR ROTARY POWER DRIVEN DEVICES
Filed Oct. 19, 1964
4 Sheets-Sheet 3
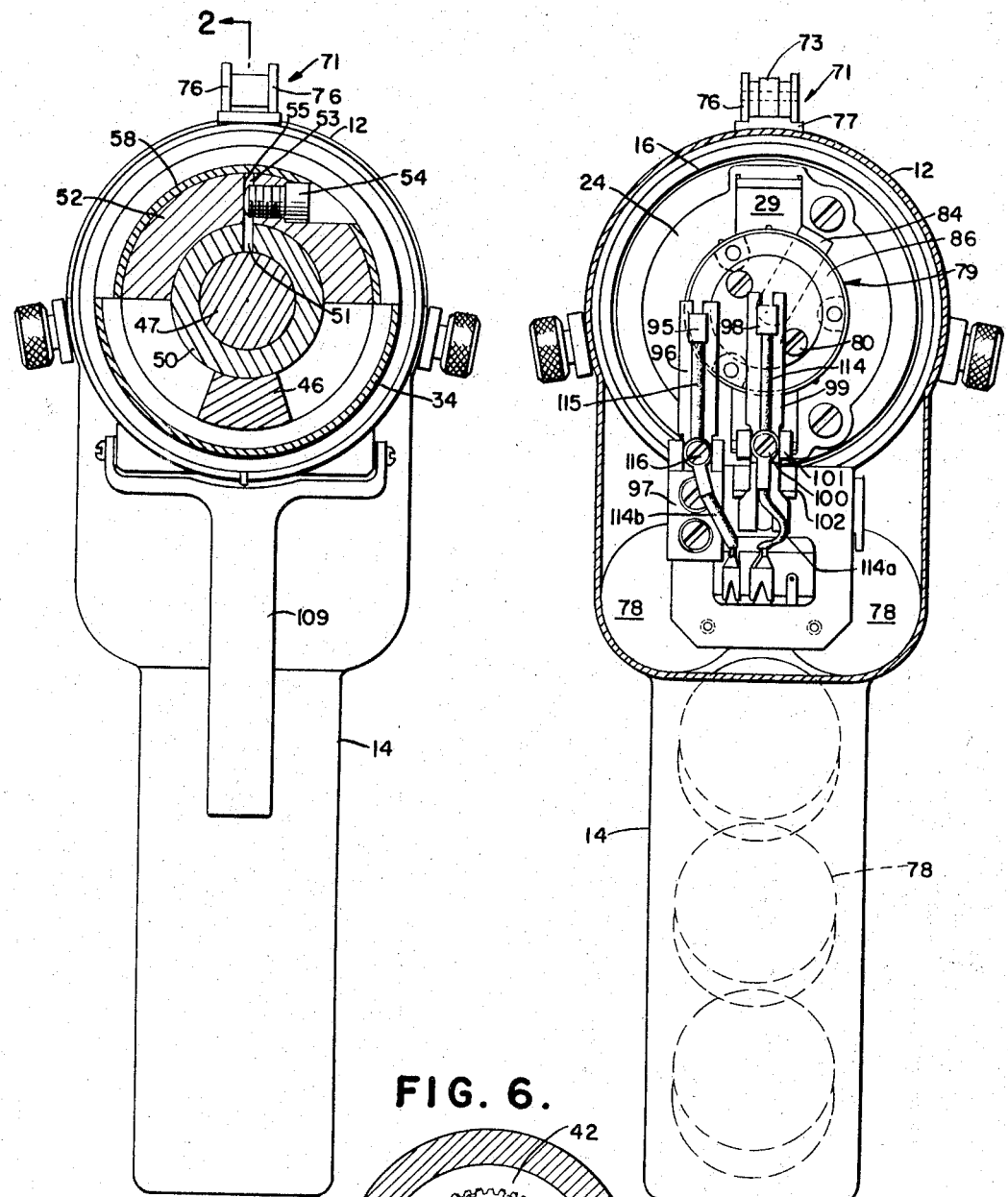
FIG. 3.
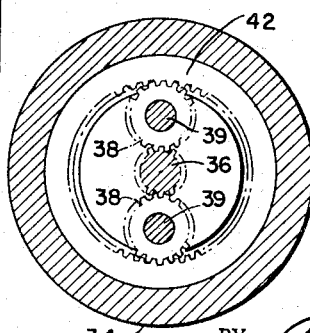
FIG. 6.
FIG. 5.
INVENTORS
MICHAEL J. PEDONE, JR.
HARRY L. BEAM
BY *Arnold and Roylance*
ATTORNEYS May 23, 1967  M. J. PEDONE, JR., ETAL  3,321,650
CONTROL MECHANISM FOR ROTARY POWER DRIVEN DEVICES
Filed Oct. 19, 1964  4 Sheets-Sheet 4
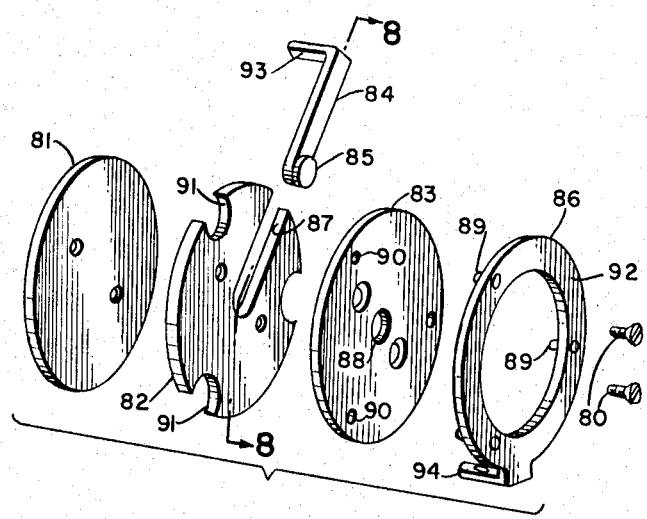
FIG. 7.
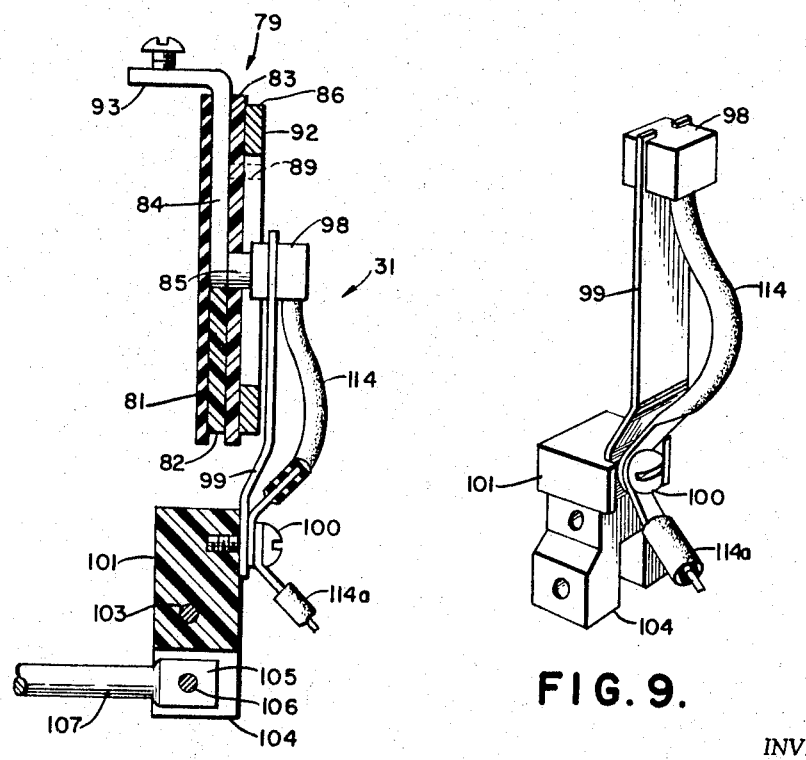
FIG. 8.
FIG. 9.
INVENTORS
MICHAEL J. PEDONE, JR.
HARRY L. BEAM
BY *Arnold and Roylance*
ATTORNEYS

United States Patent Office 3,321,650
Patented May 23, 1967

3,321,650
CONTROL MECHANISM FOR ROTARY POWER DRIVEN DEVICES
Michael J. Pedone, Jr., Lutherville, Md., and Harry L. Beam, Syracuse, N.Y., assignors to Black and Decker Manufacturing Company, Towson, Md., a corporation of Maryland
Filed Oct. 19, 1964, Ser. No. 406,955
10 Claims. (Cl. 310—115)

This invention relates to power-driven devices and, more particularly to power-driven tools and the like in which a control function must be imparted to an element of the device which is in motion at the time the control function is to be accomplished.

The invention finds special application to power-driven tools, such as that disclosed in copending application Ser. No. 400,438, filed Sept. 30, 1964, by Robert H. Riley, Jr., and Richard F. Koen, now U.S. Patent 3,294,183, which are characterized by minimal, or even zero, reaction force during operation. In such tools, the motor includes a driving structure, such as the field of an electric motor, and a driven structure, such as the motor armature, the driving and driven structures both being mounted in the tool for rotation relative to each other about a common axis. Mounting of the motor structure is accomplished by means of antifriction bearings carried by a stationary housing, and control of the motor must be attained through means carried by the housing.

In accordance with the invention, a movable control member, such as a trigger, is mounted on the stationary housing, and simple and effective means are provided for converting movement of the control member into a desired control of the motor structure. Typically, the control function is an on-off control of an electric motor, and the means for converting movement of the trigger into such control is a combination slip ring and switch mechanism. In order that the objectives and nature of the invention can be understood in detail, one advantageous embodiment of the invention will be described with reference to the accompanying drawings, which form a part of this specification, and wherein:

FIG. 3 is a transverse sectional view taken on line 3—3, FIG. 2;

FIG. 4 is a transverse sectional view taken on line 4—4, FIG. 2;

FIG. 5 is a transverse sectional view taken generally on line 5—5, FIG. 2;

FIG. 6 is a transverse sectional view taken on line 6—6, FIG. 2;

FIG. 7 is an exploded perspective view of a slip ring unit employed in the device of FIG. 1;

FIG. 8 is a transverse sectional view, taken generally on line 8—8, FIG. 7, of the slip ring unit in its assembled condition and also showing the movable contact assembly associated therewith; and FIG. 9 is a perspective view of a switching contact assembly employed in the device of FIG. 1.

Figure 1:
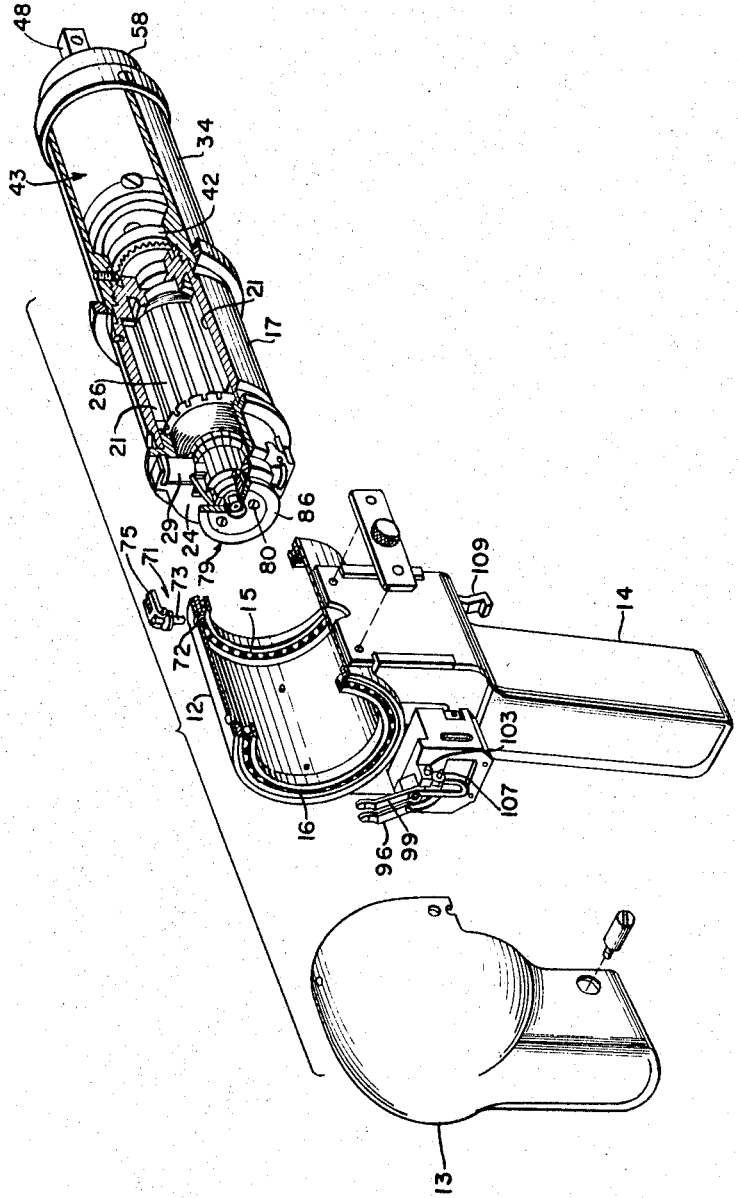
FIG. 1 is an exploded perspective view of a minimum-reaction rotary power tool embodying the invention.

Turning now to the drawings in detail, the illustrated embodiment of the invention comprises a rigid cylindrical housing member 12 closed at one end by shroud 13 and provided with a hollow handle 14 by which the tool can be held and manipulated. Journalled in housing member 12 by ball bearings 15 and 16 is a rigid member 17 having a cylindrical body portion 18 which is open at its end adjacent bearing 16 and, at the other end, includes a first transverse annular inwardly extending portion 19 and a second such portion 20. Bearings 15 and 16 support member 17 for rotation about the central axis of housing member 12, and annular portions 19 and 20 are concentric with that axis.

The cylindrical body portion 18 of member 17 embraces and supports the field structure 21 of an electrical driving motor indicated generally at 22. One end of the field structure abuts an internal transverse annular shoulder 23 provided on body portion 18, and the other end of the field structure is engaged by the closure member 24 secured to member 17, as by the longitudinally extending screws 25. The motor 22 includes a rotor structure or armature 26, the shaft of the armature being journalled at one end in a ball bearing 27 supported by portion 20 of member 17 and, at the other end, in a ball bearing 28 supported by the central portion of closure member 24. The motor is completed by conventional brush assemblies 29, carried by closure member 24 and disposed with the brushes engaging commutator 30, current being supplied to the armature via a combination switch and slip ring device indicated generally at 31 and described in detail hereinafter.

Figure 2:
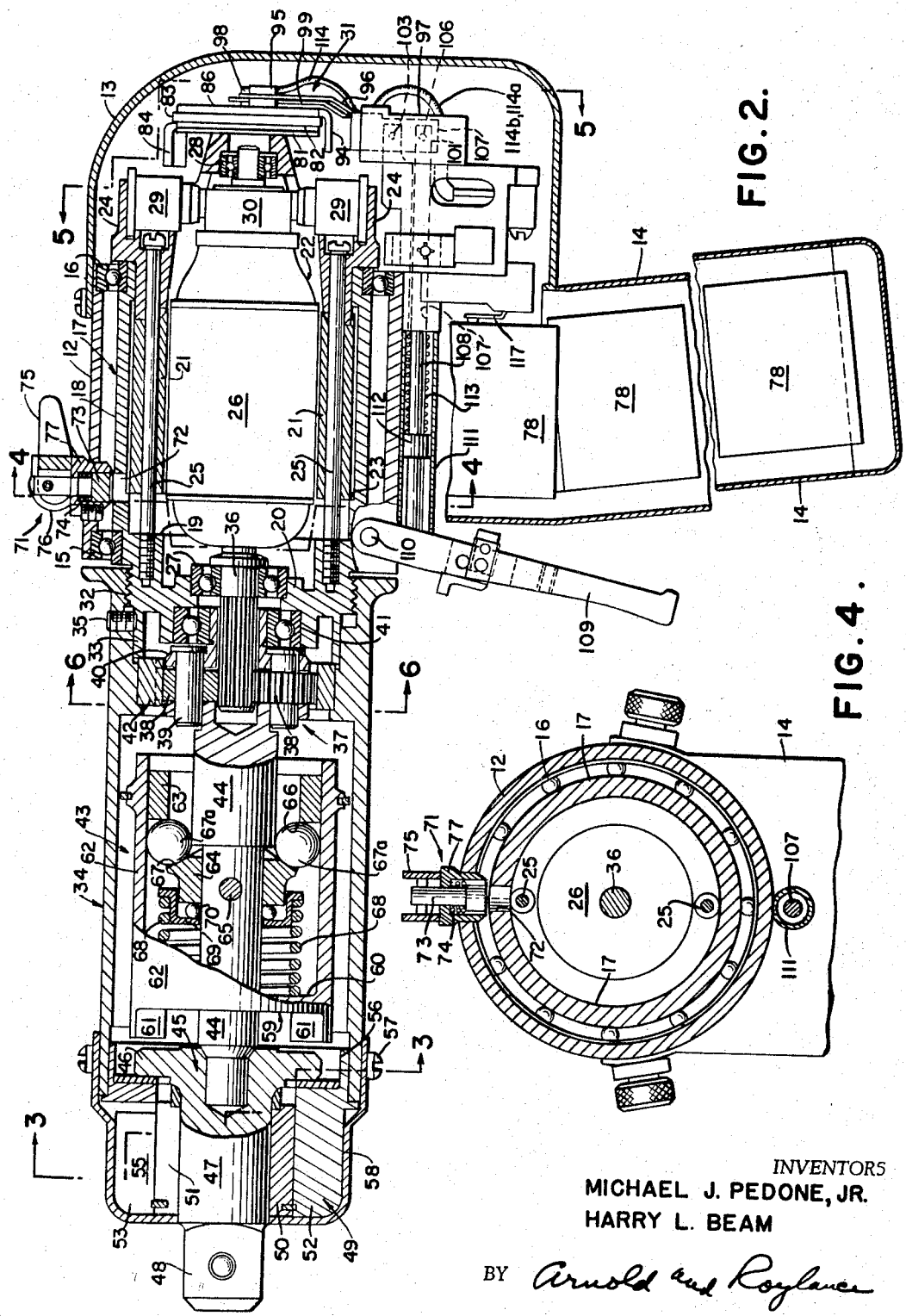
FIG. 2 is a longitudinal sectional view of the tool of FIG. 1.

At its end including annular portions 19 and 20, member 17 projects forwardly beyond housing member 12 and includes an exteriorly threaded portion 32 and a plain cylindrical tubular portion 33, FIG. 2. A cylindrical barrel member 34 is rigidly secured to member 17, one end of member 34 being interiorly threaded for engagement with exteriorly threaded portion 32. Member 34 embraces portion 33 of member 17 and a set screw 35 is provided to assure that there will be no relative rotation between members 17 and 34.

At the left or forward end of motor 22, the driven shaft of the motor is extended in the form of a toothed spindle 36 which provides the input to a speed-reduction gearing indicated generally at 37. Gearing 37 includes two planet gears 38 carried by stub shafts 39 and a rotatable carrier or cage 40 which is supported by a ball bearing 41 for rotation about the axis of armature 26. The speed reduction gearing also comprises a ring gear 42 fixedly secured to barrel member 34, as by being clamped between an internal transverse shoulder on the bearing member and the tip of cylindrical tubular portion 33 of member 17. The planet gears 38 mesh with both the internal teeth of the ring gear and the external teeth of spindle 36, in conventional fashion for planetary gearing.

Forwardly of the speed reduction gearing, barrel member 34 encloses a conventional rotary impacting mechanism, indicated generally at 43. The impacting mechanism can, for example, be constructed in accordance with United States Patent 2,792,732, issued May 21, 1957, to W. S. Brucker. Typically, the impacting mechanism comprises a central spindle 44 having one end provided with shoulders engaged by the forwardly projecting end portions of stub shafts 39, so that the speed reduction gearing 37 serves to rotate spindle 44 continuously at a speed substantially lower than the speed of rotation of the armature of motor 22. At its other end, spindle 44 has a tip portion of reduced diameter which is journalled within an axially extending recess in an anvil member 45. The anvil member includes radially displaced impact portions 46, a cylindrical shaft portion 47, and a portion 48 which is of polygonal transverse cross section and adapted to be secured to a tool element (not shown), such as a socket wrench element, in conventional fashion.

The anvil member 45 is supported for rotation, about the common axis of the motor and spindle 44, by an adjustable friction clutch indicated at 49 and generally of the type disclosed in U.S. Patent 3,127,202, issued Mar. 31, 1964, to Richard F. Koen. The clutch 49 comprises a plain cylindrical sleeve bearing 50, of bronze or the like, provided with an axially extending slot 51, bearing 50 directly engaging the shaft portion 47 of the anvil member and being itself embraced by a heavy spring collar 52. Collar 52 is provided with a slot 53 and, when properly sprung, provides a strong spring force which clamps bearing 50 against shaft portion 47 of the anvil member, so that there is a marked frictional effect tending to oppose rotation of the anvil member. The frictional effect of the clutch is manually adjusted by means of a screw 54 which is engaged in a threaded bore extending chordally with respect to collar 52 in such fashion that the tip of the screw engages the flat surface 55 presented by slot 53. Accordingly, it will be understood that rotation of screw 54 in one direction will tend to open collar 52, reducing the clamping force which is applied to bearing 50, while rotation in the opposite direction will allow the spring collar to close, increasing the frictional force applied to the bearing, and thus to the shaft portion of the anvil member.

Spring collar 52 includes a tubular extension 56, substantially larger in diameter than the anvil member, extension 56 being telescopically engaged within the front end portion of barrel member 34 and secured thereto in any suitable fashion, as by screws 57. The screws 57 also serve to mount a generally cup-shaped nose or cover portion 58 which completely encloses the friction clutch.

Surrounding spindle 44 of the impacting mechanism is a cylindrical hammer member indicated generally at 59. At its forward end, hammer member 59 includes a transverse wall 60 provided with a central opening through which spindle 44 freely projects. On the side of wall 60 adjacent the anvil, member 59 includes hammer lugs 61 adapted to cooperate with the impact portions 46 of the anvil member, as later described in more detail. The main cylindrical body portion 62 of the hammer member projects from the other side of wall 60 concentrically with respect to spindle 44.

At its end opposite wall 60, body portion 62 encloses a hammer lift camming mechanism comprising an annular hammer cam element 63 which is rigidly secured to the hammer member and spaced outwardly from spindle 44. The camming mechanism also includes a spindle cam element 64 which is secured to spindle 44, as by a pin 65. Cam elements 63 and 64 present opposed cam surfaces 66 and 67, respectively, which can be considered as portions of cylindrical surfaces each having its axis extending transversely wtih respect to the axis of spindle 44, as described in detail in aforementioned Patent 2,-792,732. Hardened cam balls 67a are engaged between cam surfaces 66 and 67.

The axial position of spindle 44 is fixed, one end of the spindle being engaged with the adjacent faces of the planet gears 38, the other end of the spindle being provided with a forwardly facing shoulder which engages a cooperating shoulder on anvil member 45. Accordingly, since spindle cam element 64 is rigidly secured to spindle 44, the axial position of the spindle cam element is also essentially fixed. The hammer member 59, on the other hand, is capable of shifting axially relative to spindle 44 and anvil member 45. The hammer member is biased toward the anvil member by a heavy prestressed helical compression spring 68 which surrounds spindle 44 and is itself surrounded by body portion 62 of the hammer member. The forward end of spring 68 directly engages the transverse wall 60 of the hammer member. The opposite end of the spring engages the outer flange of a bearing cup member 69, FIG. 2, which loosely surrounds the hub of spindle cam element 64 and bears against thrust bearing balls 70. The arrangement is such that, when there is relative rotation between hammer member 59 and spindle 44, cam surfaces 66 and 67 will be displaced to shift the hammer member axially along the spindle, either forwardly or rearwardly of the tool, depending on the direction of the relative motion.

Considering housing member 12 as being held stationary, and assuming that motor 22 is energized, it is to be noted that the combination of member 17, the permanent magnet field structure 21 of the motor, barrel member 34, and the spring collar and slotted bearing of friction clutch 49 constitute one assembly capable of rotating about the axis of the tool defined by bearings 15 and 16 and coincident with the longitudinal central axis of the driven shaft of the motor. The armature and toothed spindle of the motor constitute a second assembly capable of rotating relative to housing member 12, and the rotation of this assembly is imparted, via speed reduction gearing 37 and rotary impacting mechanism 43, to the tip portion 48 of the anvil member 45, and to whatever tool element is attached thereto.

The assembly including member 17 and barrel member 34 can be locked to housing member 12 by the manually operated locking device indicated generally at 71. Thus, member 17 is provided with a radially extending opening 72, FIG. 2, and the locking device 71 includes a radially shiftable locking pin 73 which is normally biased inwardly, to engage in opening 72, by a spring 74. An operating handle 75, in the nature of a lever, is pivotally connected to the outer end portion of the locking pin 73 and carried thereby. Handle 75 has identical cam edges 76 disposed to engage the exposed surface of the lock housing 77, the cam edges of the handle being urged into such engagement by the action of spring 74. The arrangement is such that, when the handle is pivoted in a clockwise direction, as viewed in FIG. 2, locking pin 73 is cammed radially outwardly, so as to be disengaged from opening 72 in order to free member 17 for rotation relative to housing member 12. On the other hand, when the handle is pivoted in a counterclockwise direction, as viewed in FIG. 2, the shape of the cam edges allows the locking pin 73 to be forced inwardly by spring 74, so that, when opening 72 comes into alignment with the locking pin, the locking pin can enter the opening and lock member 17 to housing member 12.

Though the motor 22 can be energized from any suitable power source, the illustrated embodiment of the invention is in the nature of a self-contained unit and employs rechargeable batteries 78, contained within handle 14, to supply energizing current to the motor via the switch and slip ring device 31. Device 31 includes a slip ring unit 79 which is rigidly secured to closure member 24, as by screws 80, FIGS. 5 and 7, so as to rotate with the assembly comprising member 17, field 21 and barrel member 34 when that assembly rotates. The slip ring unit 79 is flat and lies in a plane extending at right angles to the rotational axis defined by bearings 15 and 16. The unit includes a thin, flat backing disc 81 of electrical insulating material, an insulating spacer disc 82, an insulating slip ring supporting disc 83, an arm 84 which carries a cylindrical central contact 85, and an annular contact ring 86, all as illustrated in detail in FIGS. 7 and 8.

Disc 82 is provided with a radially extending slot 87, FIG. 7, closed at its inner end and opening through the periphery of the disc, to accommodate arm 84, the relative shapes of the arm and slot being such that, when the arm is fully inserted in the slot, contact 85 is disposed at the center of the slip ring unit. Disc 83 is flat, circular, and provided with a circular central opening 88, FIG. 7, which snugly embraces contact 85, as seen in FIG. 8. Contact ring 86 has an outer diameter slightly smaller than that of disc 83, an inner diameter markedly greater than the diameter of contact 85 and a plurality of equally spaced openings each accommodating a rivet 89, the rivets being fixed to the contact ring and projecting rearwardly therefrom. Disc 83 is provided with apertures 90 through which rivets 89 extend, and disc 82 has peripheral notches 91 to accommodate the ends of the rivets when the same have been upset or otherwise deformed to secure ring 86 to disc 83. Discs 81, 82 and 83 are each provided with apertures to accommodate screws 80. The heads of rivets 89 lie in the plane of the exposed flat circular face 92 of contact ring 86.

The outer end of arm 84 is bent at right angles to provide a lug 93 to which a conductor (not shown) is connected, the conductor extending to and being connected to one of the brushes of the motor 22. Similarly, a lug 94 is provided, integral with contact ring 86, for connection to the other brush of the motor.

A brush contact 95, carried by a spring arm 96 secured to an insulating support 97 carried by housing member 12, is disposed for constant sliding contact with face 92 of contact ring 86. A second brush contact 98 is carried by a spring arm 99 and constitutes the movable contact of the combined switch and slip ring unit. Arm 99 is secured by screw 100, FIG. 8, to a block 101 of electrical insulating material, block 101 is mounted on a stationary support 102 for pivotal movement about the axis defined by pin shaft 103, support 102 being secured to housing member 12. The lower end portion 104 of block 101 is bifurcated, accommodating the flat end portion 105 of a push rod 107. The end portion 105 of the rod is pivotally connected to block 101 by pin shaft 106, FIG. 8.

Push rod 107 is disposed below housing member 12 and is constrained by a bore 108, FIG. 2, in support 102. Rod 107 extends parallel to the axis of rotation of armature 26 and is so positioned that its longitudinal axis passes directly below central contact 85 of the slip ring unit. The forward end of rod 107 engages a trigger 109 which is mounted on housing member 12 to swing about the transverse axis indicated at 110, FIG. 2, axis 110 and the axes determined by pin shafts 103 and 106 all being parallel to each other and at right angles to the axis of rotation defined by bearings 15 and 16. Forwardly of support 102, the push rod extends through a tube 111 and is provided with an enlargement 112 presenting a shoulder directed toward support 102. A helical compression spring 113 surrounds the push rod and is engaged between enlargement 112 and support 102 to bias the push rod toward trigger 109.

Assuming trigger 109 to be free, spring 113 moves push rod 107 forwardly, causing block 101 and arm 99 to pivot clockwise, as viewed in FIG. 2, so that brush contact 98 is moved out of engagement with the central contact 85 of the slip ring unit. When the operator actuates the trigger toward handle 14, push rod 107 is forced rearwardly, compressing spring 113, and block 101 and arm 99 are pivoted counterclockwise, as viewed in FIG. 2, swinging brush contact 98 into engagement with central slip ring contact 85. When the trigger 109 is released, spring 113 urges the push rod forwardly, returning it to its initial position, so that the combination of block 101 and arm 99 is again pivoted in a clockwise direction, as viewed in FIG. 2, to disengage brush contact 98 from contact 85. Any suitable releasable lock mechanism (not shown) can be provided on support 102 to retain the push rod in its rearwardly actuated position, so the operator need not hold trigger 109 in its rearwardly actuated position.

Contact arm 99 is shunted by a flexible insulated conductor 114 extending between and connected electrically to brush contact 98 and screw 100 to provide a low resistance connection to contact 98. Similarly, contact arm 96 is shunted by a flexible insulated conductor 115 extending between brush contact 95 and the screw 116, FIG. 5, by which the arm 96 is secured to support 97. Screws 100 and 116 are connected by suitable wiring, including flexible insulated conductors 114a and 114b, FIG. 5, to the respective contacts 117, FIG. 2, which engage the terminals of the uppermost batteries 78, it being understood that the several batteries are interconnected to constitute a unitary power supply. Accordingly, when brush contact 98 is pivoted into engagement with the center contact 85 of the slip ring unit as a result of actuation of the trigger, the batteries are connected to energize motor 22, and such energization is maintained even though member 17, and therefore the slip ring unit, be rotating as a result of operation of the tool. When the trigger is released, and the push rod is allowed to move forwardly under the biasing action of spring 113, arm 99 is again pivoted in a clockwise direction to disengage brush contact 98 from contact 85 so that motor 22 is deenergized.

Advantageously, the free ends of arms 96 and 99 are bifurcated, and brush contacts 95 and 98 are in the form of polygonal blocks having laterally opening, longitudinally extending grooves in which the bifurcated end portions of the arms are engaged to retain the brush contacts.

When the tool is to be used, the operator grasps handle 14 and actuates trigger 109 rearwardly, toward the handle, so that rod 107 is forced rearwardly, and the combination of block 101, arm 99 and brush contact 98 is pivoted in a counterclockwise direction (as viewed in FIG. 2) to bring contact 98 into engagement with the center contact 85 of slip ring unit 79. Such contact engagement completes the energizing circuit between batteries 78 and motor 22, so that the motor commences operation.

Since the field structure and armature are mounted for rotation both relative to each other and to housing member 12, the field structure and the armature tend to counter-rotate, both turning relative to the housing, as soon as the motor is energized, so that permanent electrical connections between the motor and the housing cannot be employed. The combined switch and slip ring device of this invention thus allows continuous energization of the motor despite the unique relationship of the motor to the housing.

During operation of the tool, the only reaction force imparted to the housing, and thus to the operator who holds the tool, is that which results from frictional drag in bearings 15, 16 and at the brushes of the motor. As described in detail in the aforementioned U.S. Patent 3,294,183 the provision of friction clutch 49 enables the impacting mechanism 43 to operate in virtually conventional fashion, even through the combination of the motor field structure, member 17, and barrel member 34 is capable of rotation relative to the motor armature, the reaction torque developed in the impacting mechanism being imparted via barrel member 34, clutch 49 and anvil member 45 to the nut or other work element being driven.

Though one particularly advantageous embodiment of the invention has been chosen for illustrative purposes, it will be clear to those skilled in the art that various changes and modifications can be made therein without departing from the scope of the invention as defined in the appended claims.

What is claimed is:
1. In a power-driven tool, the combination of
a housing;
an electrical motor comprising a field structure and an armature;
bearing means mounting said motor in said housing with said field structure and said armature supported for rotation relative to each other and relative to said housing;
slip ring means carried by said field structure for rotation therewith;
at least one contact member mounted on said housing for selective movement into and out of engagement with said slip ring means;
a manual control member movably mounted on said housing; and
means connecting said control member to said contact member to selectively move same into and out of engagement with said slip ring member,
said motor being connected to be energized via said slip ring means and contact member.
2. In a power-driven tool, the combination of
a housing;
a first rotatable assembly comprising
the field structure of an electrical motor; and
a slip ring unit;

bearing means supporting said first assembly on said housing for rotation about a fixed axis;
a second rotatable assembly including the armature of said electrical motor;
bearing means supporting said second assembly on said housing for rotation, relative to both said housing and said first assembly, about said axis;
said slip ring unit comprising an electrically conductive element having a flat surface disposed in a plane at right angles to said axis;
a contact arm;
means mounting said contact arm for movement toward and away from said slip ring unit in a plane at least generally parallel to said axis;
a contact member fixed to said contact arm and disposed to come into sliding engagement with said flat surface of said electrically conductive element when said contact arm is moved toward said slip ring unit;
a manual control member mounted on said housing for movement between a first and a second position; and
means connecting said control member to said contact arm to move said contact arm toward and said contact member into engagement with said slip ring unit when said control member is moved to said second position,
said motor being connected for energization via said contact member and said electrically conductive element.

3. A tool according to claim 2, wherein
said means mounting said contact arm comprises a support member mounted for pivotal movement about an axis which extends at right angles to the axis of rotation of said rotatable assemblies and is spaced laterally therefrom,
said contact arm being fixed to said support member and projecting therefrom into proximity with said slip ring unit.

4. A tool according to claim 3, wherein
said manual control member is mounted for pivotal movement at least generally in the same plane as is said contact arm, and
said means connecting said control member to said contact arm includes a rod extending from said manual control member to said support member,
said rod being pivotally connected to said support member.

5. In a power-driven tool, the combination of
a housing;
a handle secured to and projecting generally laterally from said housing,
the tool having a longitudinal axis extending forwardly from a point behind said handle;
an electric motor disposed in said housing and including a field structure and an armature structure;
bearing means mounting said field structure on said housing for rotation relative to said housing and about said longitudinal axis;
bearing means mounting said armature structure for rotation about said axis relative to both said housing and said field structure;
current supply means operatively connected to said motor to energize the same and comprising
an electrically conductive element secured to said field structure for rotation therewith,
a movable contact, and
a contact arm carrying said movable contact and mounted on said housing for pivotal movement between a fist position, in which said movable contact is separated from said electrically conductive element to prevent flow of current to said motor, and a second position, in which said movable contact slidably engages said electrically conductive element and allows current to be supplied to said motor;
a manual control member movably mounted adjacent said handle; and
means connected to said contact arm and operatively associated with said manual control member for moving said contact arm from said first position to said second position when said manual control member is moved in one direction.

6. A tool according to claim 5, wherein
said contact arm extends generally transversely of the tool and is arranged with its pivotal axis at right angles to said longitudinal axis,
said manual control member is disposed in front of said handle and mounted for pivotal movement about an axis parallel to the axis of pivotal movement of said contact arm, and
said means connected to said contact arm for moving the same includes a member mounted for rectilinear movement parallel to said longitudinal axis, said last-mentioned member being pivoted to said contact arm at a point spaced from the pivotal axis of said contact arm.

7. A tool according to claim 6, wherein
said handle, said contact arm and said manual control member extend generally in a common plane which includes said longitudinal axis and extends at right angles to the pivotal axes of said contact arm and said manual control member.

8. A tool according to claim 7, wherein
said current supply means comprises a slip ring unit secured to said field structure and comprising a central conductive element and a circular conductive element concentrically surrounding said central conductive element,
said central conductive element constituting said electrically conductive element engaged by said movable contact,
said current supply means further comprising a fixed contact member slidably engaged with said circular conductive element and supported by said housing.

9. In a power-driven tool, the combination of
housing means;
an electrical motor comprising a field structure and an armature;
bearing means mounting said motor in said housing means with said field structure and said armature supported for rotation, relative to each other and relative to said housing, about a common axis;
slip ring means carried by said field structure for rotation therewith and including an electrically conductive element;
a movable contact assembly comprising
a support member of electrical insulating material;
a spring arm having a free end portion and a mounted end portion;
fastener means securing said mounted end portion of said arm to said support member;
a brush contact carried by said free end portion of said arm; and
an electrical conductor connected to said brush contact and extending to said fastener means to shunt said arm;
means mounting said support member on said housing means for pivotal movement about an axis which is spaced laterally from and extends at right angles to the common axis of rotation of said field structure and said armature,
said arm extending into proximity with said slip ring means,
the combination of said support member, said arm and said brush contact being pivotable between a first position, in which said brush contact is spaced from said conductive element of said slip ring means, and a second position, in which said brush contact slidably engages said conductive element;
a manual control member movably mounted on said housing means; and
means operated by said control member for pivoting the combination of said support member, said arm and said brush contact from said first position to said second position.

10. In a power driven tool, the combination of
a housing;
a handle secured to and projecting generally laterally from said housing;
   the tool having a longitudinal axis extending forwardly from a point behind said handle;
a first rotatable assembly comprising
   the field structure of an electric motor; and
   a slip ring unit adjacent an end of the field structure;
bearing means supporting said first assembly on said housing for rotation about a fixed axis;
contact means mounted on said housing adjacent said end of said field structure and slidably engageable with said slip ring unit to conduct current from said housing to said field structure;
a second rotatable assembly including the armature of said electric motor,
   said armature having a commutator;
bearing means carried by said first rotatable assembly and supporting said second rotatable assembly on said housing for rotation, relative to both said housing and said first assembly, about said axis, with said commutator adjacent the end of the field structure where said slip ring unit is located;
brush means carried by said field structure adjacent the end of the field structure where said slip ring unit is located,
   said brush means engaging said commutator, and current being supplied to said armature via said slip ring unit, brush means, and commutator;
a control, having an actuator carried by said handle, to selectively energize said motor and supply current from a power source to said armature via said contact means, slip ring unit, brush means, and commutator.

References Cited by the Examiner

UNITED STATES PATENTS

| | | | |
|---|---|---|---|
| 1,298,757 | 4/1919 | Meyer | 310—115 |
| 2,462,182 | 2/1949 | Guerdan | 310—115 |
| 2,740,909 | 4/1956 | Chapman | 310—115 |
| 3,024,376 | 3/1962 | Ostler | 310—115 |
| 3,252,023 | 5/1966 | Schmidt | 310—115 |

MAX L. LEVY, *Primary Examiner.*

J. D. MILLER, *Assistant Examiner.*